United States Patent
Zhou

(10) Patent No.: US 8,477,877 B2
(45) Date of Patent: Jul. 2, 2013

(54) FEED-FORWARD CARRIER PHASE RECOVERY FOR OPTICAL COMMUNICATIONS

(75) Inventor: Xiang Zhou, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 296 days.

(21) Appl. No.: 12/821,426

(22) Filed: Jun. 23, 2010

(65) Prior Publication Data

US 2011/0318021 A1     Dec. 29, 2011

(51) Int. Cl.
*H03D 3/24* (2006.01)

(52) U.S. Cl.
USPC ........... 375/327; 375/136; 375/147; 375/326; 375/341; 375/373

(58) Field of Classification Search
USPC ............... 375/320, 327, 371, 376, 341, 136, 375/147, 325, 326; 398/202
See application file for complete search history.

(56) References Cited

U.S. PATENT DOCUMENTS

| | | | | |
|---|---|---|---|---|
| 4,675,882 | A * | 6/1987 | Lillie et al. | 375/324 |
| 5,852,630 | A * | 12/1998 | Langberg et al. | 375/219 |
| 6,493,409 | B1 | 12/2002 | Lin et al. | |
| 6,560,294 | B1 | 5/2003 | Gatherer | |
| 6,671,342 | B2 | 12/2003 | Lin et al. | |
| 6,904,098 | B1 | 6/2005 | Isaksen et al. | |
| 7,079,574 | B2 * | 7/2006 | Rafie et al. | 375/232 |
| 7,327,819 | B2 | 2/2008 | Lin et al. | |
| 7,369,633 | B2 * | 5/2008 | Jiang et al. | 375/354 |
| 2003/0058967 | A1 | 3/2003 | Lin et al. | |
| 2004/0081257 | A1 | 4/2004 | Lin et al. | |
| 2004/0190595 | A1 * | 9/2004 | Litvin | 375/132 |

OTHER PUBLICATIONS

Jumpei Hongou, et al., "1 Gsymbolls, 64QAM Coherent Optical Transmission Over 150 km With a Spectral Efficiency of 3 bit/s/Hz", in Proc. OFC'07, Anaheim, OMP3, Mar. 2007.
Yojiro Mori, et al., "200-km Transmission of 100-Gbit/s 32-QAM Dual-Polarization Signals using a Digital Coherent Receiver", in ECOC'08, Paper 8.4.6, Sep. 20-24, 2009.
X. Zhou, et al., "32Tb/s (320×114Gb/s) PDM-RZ-8QAM Transmission Over 580km of SMF-28 Ultra-Low-Loss Fiber", in Proc. OFC'09, PDPB4, Mar. 22-26, 2009.
P.J. Winzer, et al., "112-Gb/s Polarization-Multiplexed 16-QAM on a 25-GHz WDM Grid", in Proc. ECOC'08, Sep. 2008, paper Th.3.E.5.

(Continued)

*Primary Examiner* — Dhaval Patel
(74) *Attorney, Agent, or Firm* — Wolff & Samson PC

(57) ABSTRACT

The carrier phase of a carrier wave modulated with information symbols is recovered with a multi-stage, feed-forward carrier phase recovery method. A series of digital signals corresponding to the information signals is received. For each digital signal, a coarse phase recovery is performed to determine a first phase angle which provides a first best estimate of the information symbol corresponding to the digital signal. Using the first best estimate as input, a second stage of estimation is then performed to determine a second phase angle which provides an improved (second) best estimate of the information symbol. Additional stages of estimation can be performed. The multi-stage, feed-forward carrier phase recovery method retains the same linewidth tolerance as a single-stage full blind phase search method; however, the required computational power is substantially reduced. The multi-stage, feed-forward carrier phase recovery method is highly efficient for M-QAM optical signals.

16 Claims, 10 Drawing Sheets

OTHER PUBLICATIONS

X. Zhou, et al., "200 Gb/s PDM-16QAM Generation Using a New Synthesizing Method", paper 10.3.5, Sep. 20-24, 2009.

A. Sano, et al., "240-Gb/s Polarization-Multiplexed 64-QAM Modulation and Blind Detection Using PLC-LN Hybrid Integrated Modulator and Digital Coherent Receiver", ECO2009, PD2.2, Sep. 2009.

X. Zhou, et al., "Multi-Level, Multi-Dimensional Coding for High-Speed and High Spectral-Efficiency Optical Transmission", J. Lightwave Technology, vol. 27, No. 16, pp. 3641-3653, Aug. 2009.

A. Tarighat, et al., "Digital Adaptive Phase Noise Reduction in Coherent Optical Links", J. Lightwave Technology vol. 24, No. 3, pp. 1269-1276, Mar. 2006.

H. Louchet, et al., "Improved DSP Algorithms for Coherent 16-QAM Transmission", in Proc. ECOC'08, Brussels, Belgium, Sep. 21-25, 2008, Tu.1.E.6.

M. Seimetz, "Laser Linewidth Limitations for Optical Systems with High-Order Modulation Employing Feed Forward Digital Carrier Phase Estimation", in Proc. OFC/NFOEC'08, San Diego, CA, Feb. 24-28, 2008, OTuM2.

T. Pfau, et al., "Hardware-Efficient Coherent Digital Receiver Concept with Feed-Forward Carrier Recovery for M-QAM Constellations", Journal of Lightwave Technology, vol. 27, No. 8, Apr. 15, 2009.

J.G.Proakis, Digital Communications, 4th Edition, Chapter 6, pp. 348, Year 2000.

I. Fatadin, "Compensation of Frequency Offset for Differentially Encoded 16- and 64-QAM in the Presence of Laser Phase Noise", IEEE Photonics Technology Letters, vol. 22, No. 3, Feb. 1, 2010.

* cited by examiner

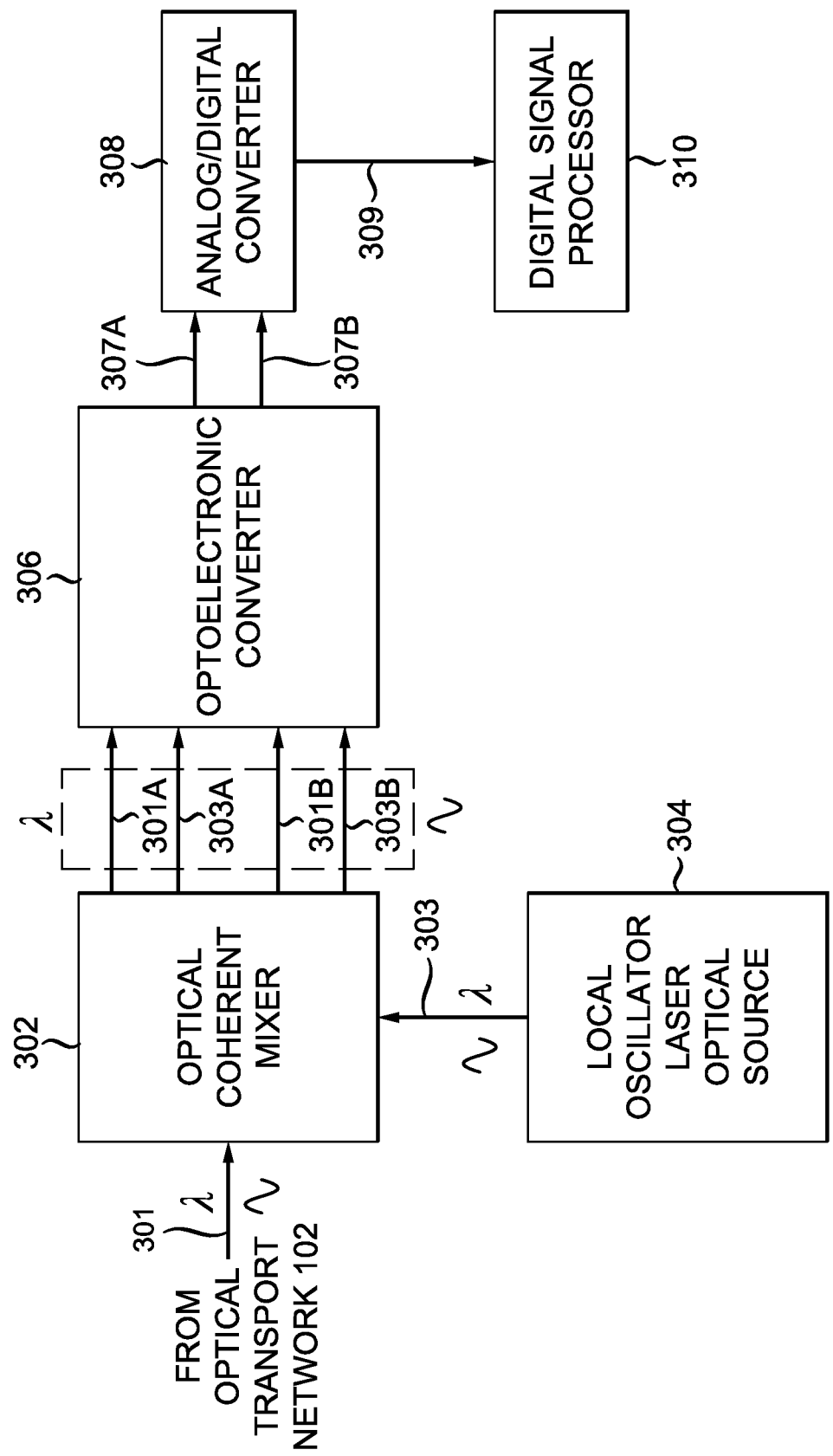

FEED-FORWARD CARRIER PHASE RECOVERY FOR OPTICAL COMMUNICATIONS

BACKGROUND

The present disclosure relates generally to optical communications, and more particularly to feed-forward carrier phase recovery.

The popularity of multimedia communications services over packet data networks, such as the Internet, continues to grow; consequently, the demand for higher capacity in core data transport networks continues to grow. For service providers, core data transport networks are optical networks based on fiberoptic technology. To increase the capacity of optical networks, advanced signal modulation techniques, such as quadrature amplitude modulation (QAM) and quadrature phase shift key (QPSK) have been developed. In particular, M-ary QAM (M-QAM) (such as square 16-QAM and 64-QAM) have the potential to realize optical transmission at very high speeds with high spectral efficiency.

Digital coherent detection has proven to be an effective technique for detecting and demodulating the received optical signals. A key step in digital coherent detection is carrier phase recovery. Carrier phase is degraded by laser phase noise in the received optical signal. Laser phase noise is dependent on the linewidth of the optical carrier. For high-order M-QAM modulation formats (M>4), the tolerance for laser phase noise becomes smaller as the modulation level increases, because the Euclidean distance becomes smaller. Consequently, carrier phase recovery methods with improved laser linewidth tolerance are critical for successful implementation of high-order M-QAM modulation formats.

Various carrier phase recovery methods have been developed. One method is based on a decision-directed phase-locked loop. This method has relatively poor laser linewidth tolerance because the phase estimate is based on a previous set of data symbols, not the most current data symbols. In practice, carrier phase recovery methods are implemented in hardware using parallel and pipeline architectures to attain real-time high-speed systems. The tolerance for laser linewidth can then become worse due to extended feedback delay.

A second carrier phase recovery method is based on the classic feed-forward M-th power algorithm using dedicated symbols. Because only a small portion of the symbols can be used for phase estimate for high-order M-QAM, however, this method also has inherently poor laser linewidth tolerance.

A third carrier phase recovery method is based on a blind phase search algorithm. Since this method employs a feed-forward configuration and also involves all the current symbols for phase estimate, it can achieve much better laser linewidth tolerance than the previous two methods. This method, however, is complex because the required number of test phase angles increases with the modulation level. For high-order M-QAM, the required number is very high; for example, >32 is required for square 64-QAM. Since testing a single phase angle by itself requires a series of computationally intensive steps (rotate a set of data symbols, make a decision, and calculate the mean squared error), the computational power required for real-time testing of a large number of phase angles is very high.

BRIEF SUMMARY

The carrier phase of a carrier wave modulated with information symbols is recovered with a multi-stage carrier phase recovery method. A series of digital signals corresponding to the information signals is received. For each digital signal, an initial coarse phase recovery is performed to determine a first phase angle which provides a first best estimate of the information symbol corresponding to the digital signal. Embodiments of the initial coarse phase recovery include a coarse blind phase search and a decision-directed phase-locked loop. A second stage of estimation is then performed to determine a second phase angle which provides a second best estimate of the information symbol. The second best estimate is based at least in part on the first best estimate. Embodiments of the second stage of estimation can be a maximum likelihood estimate, an average phase rotation estimate, and a restricted blind phase search estimate.

These and other advantages of the disclosure will be apparent to those of ordinary skill in the art by reference to the following detailed description and the accompanying drawings.

BRIEF DESCRIPTION OF THE DRAWINGS

FIG. 3 shows a schematic of an optical receiver;

DETAILED DESCRIPTION

Figure 1:
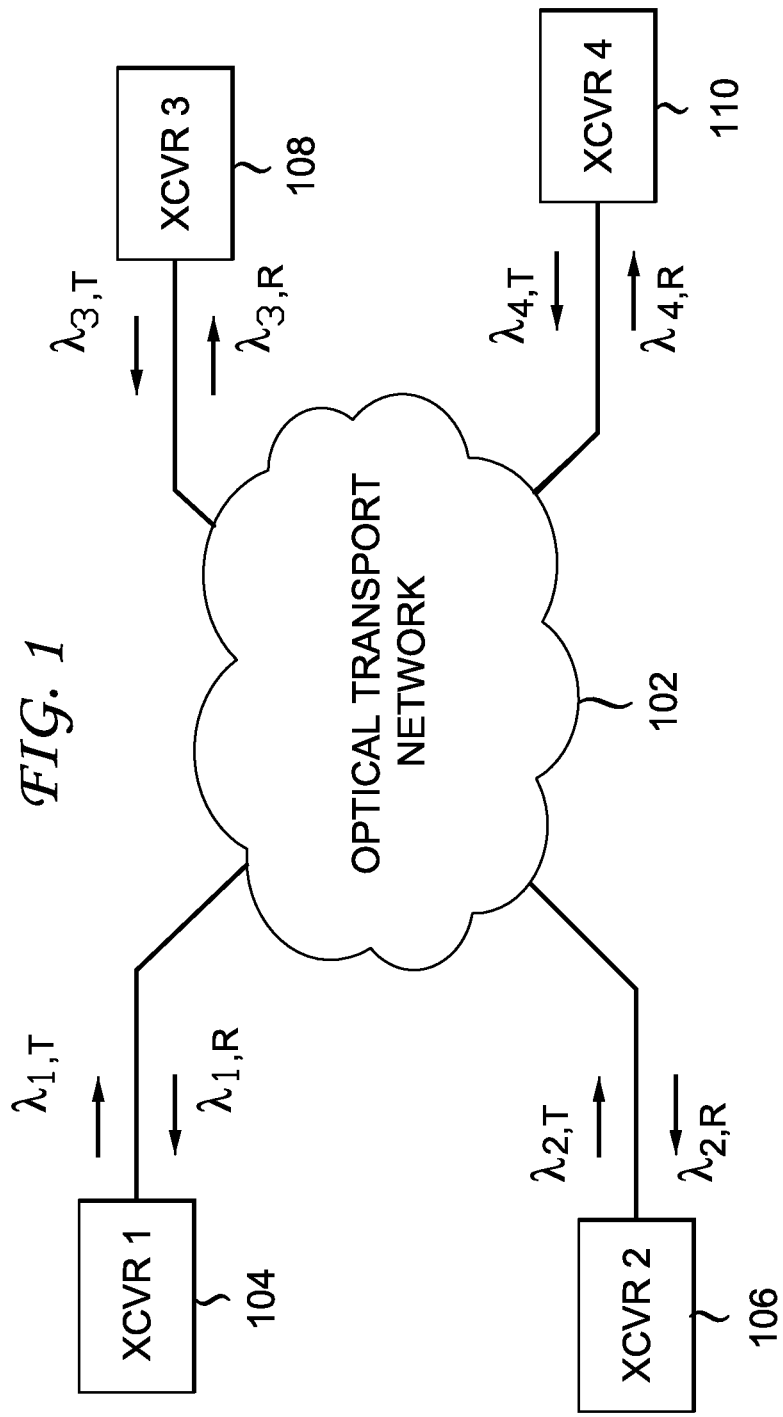
FIG. 1 shows a schematic of a generic optical communications system.

FIG. 1 shows a schematic of a generic optical telecommunications system. Multiple optical transceivers (XCVRs) send and receive lightwave signals via optical transport network 102. Shown are four representative transceivers, referenced as XCVR 1 104, XCVR 2 106, XCVR 3 108, and XCVR 4 110, respectively. In some optical telecommunications systems, optical transport network 102 can include all optical components. In other optical telecommunications systems, optical transport network 102 can include a combination of optical and optoelectronic components. The transport medium in optical transport network 102 is typically optical fiber; however, other transport medium (such as air, in the case of free-space optics) can be deployed.

Each transceiver has a corresponding transmit wavelength $(\lambda_{n,T})$ and a corresponding receive wavelength $(\lambda_{n,R})$, where n=1-4. In some optical telecommunications systems, the transmit and receive wavelengths for a specific transceiver are the same. In other optical telecommunications systems, the transmit and receive wavelengths for a specific transceiver are different. In some optical telecommunications systems, the transmit and receive wavelengths for at least two separate transceivers are the same. In other optical telecommunications systems, the transmit and receive wavelengths for any two separate transceivers are different.

Figure 2:
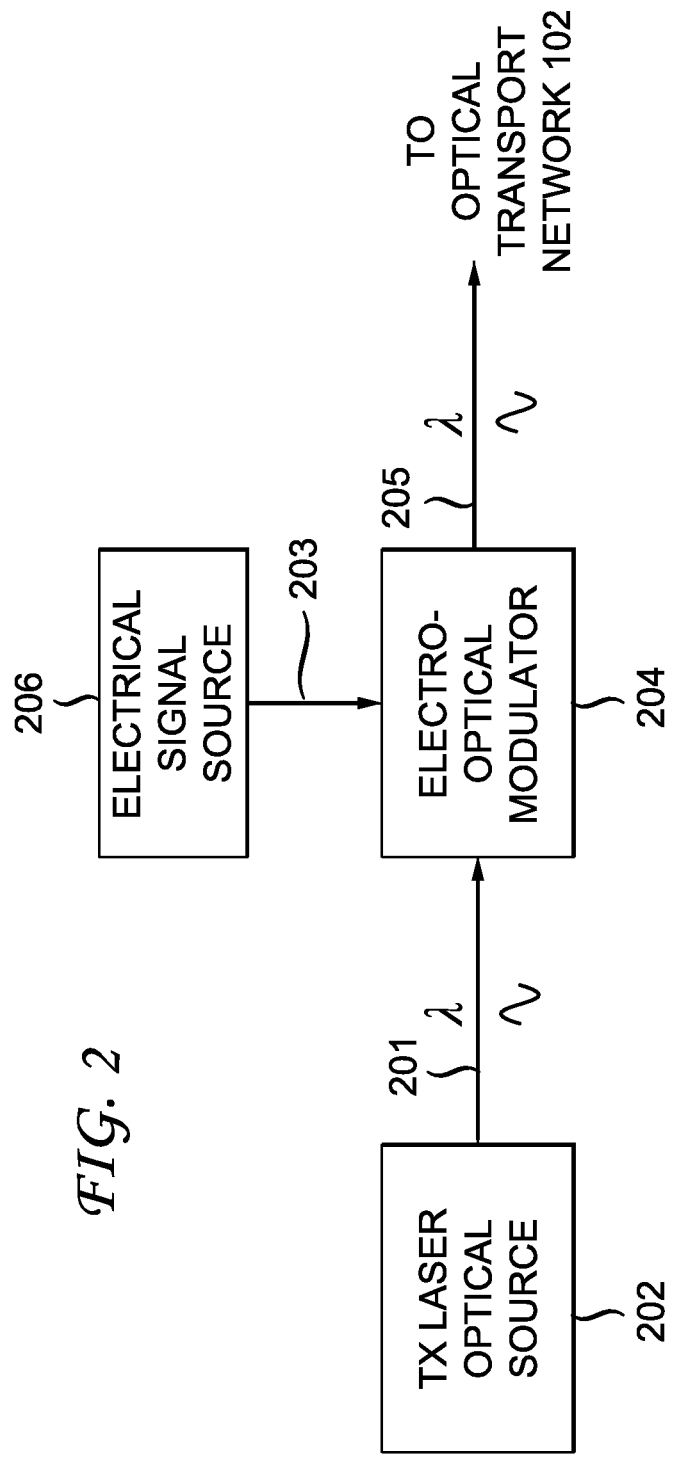
FIG. 2 shows a schematic of an optical transmitter.

FIG. 2 shows a schematic of an example of an optical transmitter. Transmit (Tx) laser optical source 202 transmits a continuous wave (CW) optical beam 201 (with wavelength $\lambda$) into electro-optical modulator 204, which is driven by electrical signal 203 generated by electrical signal source 206.

Electrical signal 203 consists of an electrical carrier wave modulated with information symbols (data symbols). The output of electro-optical modulator 204 is carrier optical beam 205, which consists of a corresponding optical carrier wave modulated with information symbols. In general, the amplitude, frequency, and phase of the optical carrier wave can be modulated with information symbols. Carrier optical beam 205 is transmitted to optical transport network 102 (see FIG. 1).

FIG. 3 shows a schematic of an example of an optical receiver. Carrier optical beam 301, with wavelength λ, is received from optical transport network 102 (see FIG. 1). Carrier optical beam 301 has an optical carrier wave modulated with information symbols. In general, the optical receiver determines the amplitude, frequency, and phase of the modulated optical carrier wave to recover and decode the information symbols. Carrier optical beam 301 is transmitted into optical coherent mixer 302. Local oscillator laser optical source 304 generates a reference optical beam 303, with wavelength λ, modulated with an optical reference wave with tunable reference amplitudes, reference frequencies, and reference phases. Reference optical beam 303 is transmitted into optical coherent mixer 302.

Optical coherent mixer 302 splits carrier optical beam 301 into carrier optical beam 301A and carrier optical beam 301B. Optical coherent mixer 302 splits reference optical beam 303 into reference optical beam 303A and reference optical beam 303B, which is phase-shifted by 90 degrees from reference optical beam 303A. The four optical beams are transmitted into optoelectronic converter 306, which contains a pair of photodetectors (not shown). One photodetector receives carrier optical beam 301A and reference optical beam 303A to generate analog in-phase electrical signal 307A. The other photodetector receives carrier optical beam 301B and reference optical beam 303B to generate analog quadrature-phase electrical signal 307B. Analog in-phase electrical signal 307A and analog quadrature-phase electrical signal 307B are transmitted into analog/digital converter (ADC) 308. The output of ADC 308, represented schematically as a single digital stream, digital signal 309, is transmitted into digital signal processor 310. Digital signal processor 310 performs multiple operations, including timing synchronization, equalization, carrier frequency recovery, carrier phase recovery, and decoding.

An optical signal degrades as it propagates from the optical transmitter to the optical receiver. In particular, laser phase noise introduces some uncertainty in the carrier phase of the received signal relative to the carrier phase of the transmitted signal assuming no laser phase noise. Carrier phase recovery refers to recovery of the correct carrier phase (carrier phase as originally transmitted assuming no laser phase noise) from the received signal. In practice, a best estimate of the carrier phase is determined from the received signal such that a decoded information symbol at the receiver is a best estimate of the corresponding encoded information symbol at the transmitter. Carrier phase recovery determines the phase angle by which an initial decoded information signal is rotated to yield the best estimate of the corresponding encoded information signal.

Figure 4A:
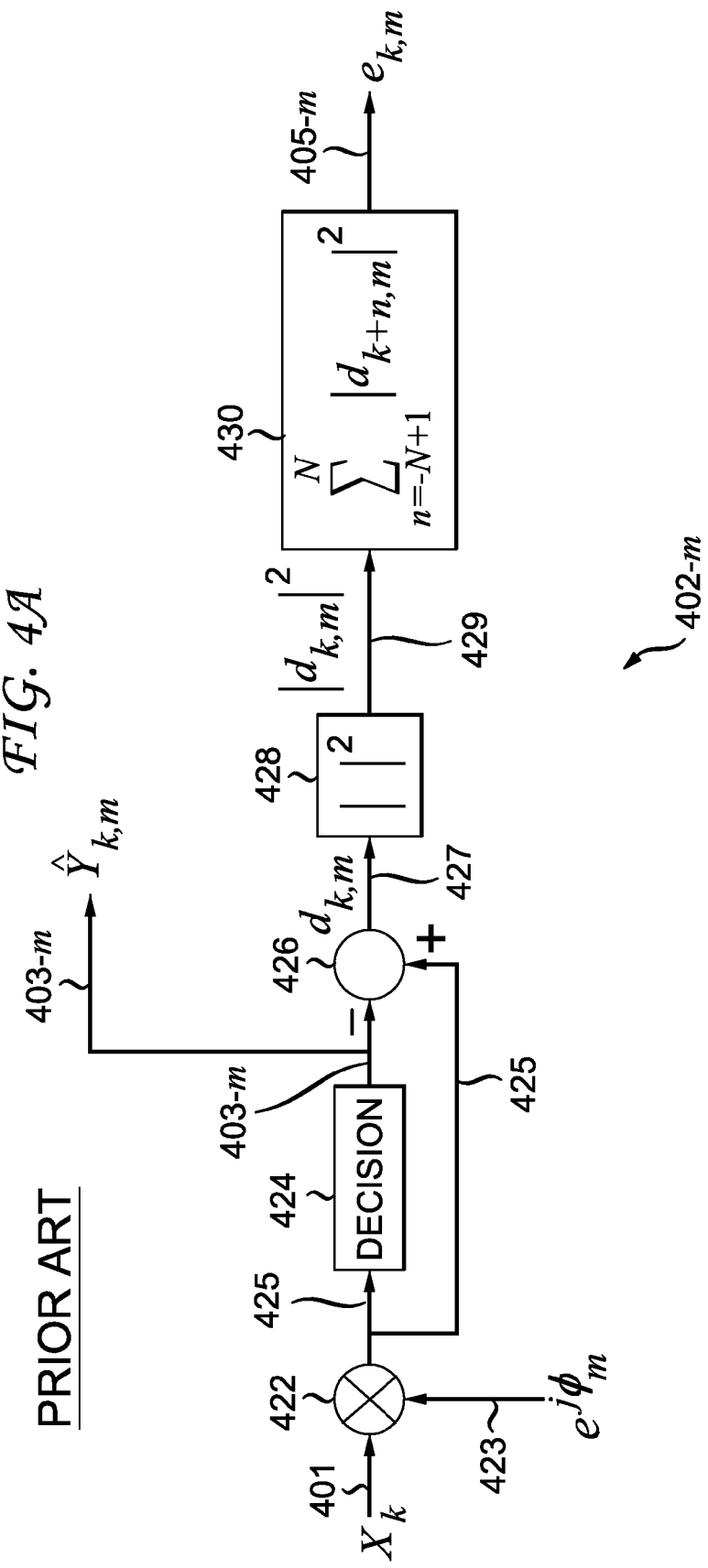
FIG. 4A and FIG. 4B show a schematic of a single-stage blind phase search method.
Figure 4B:
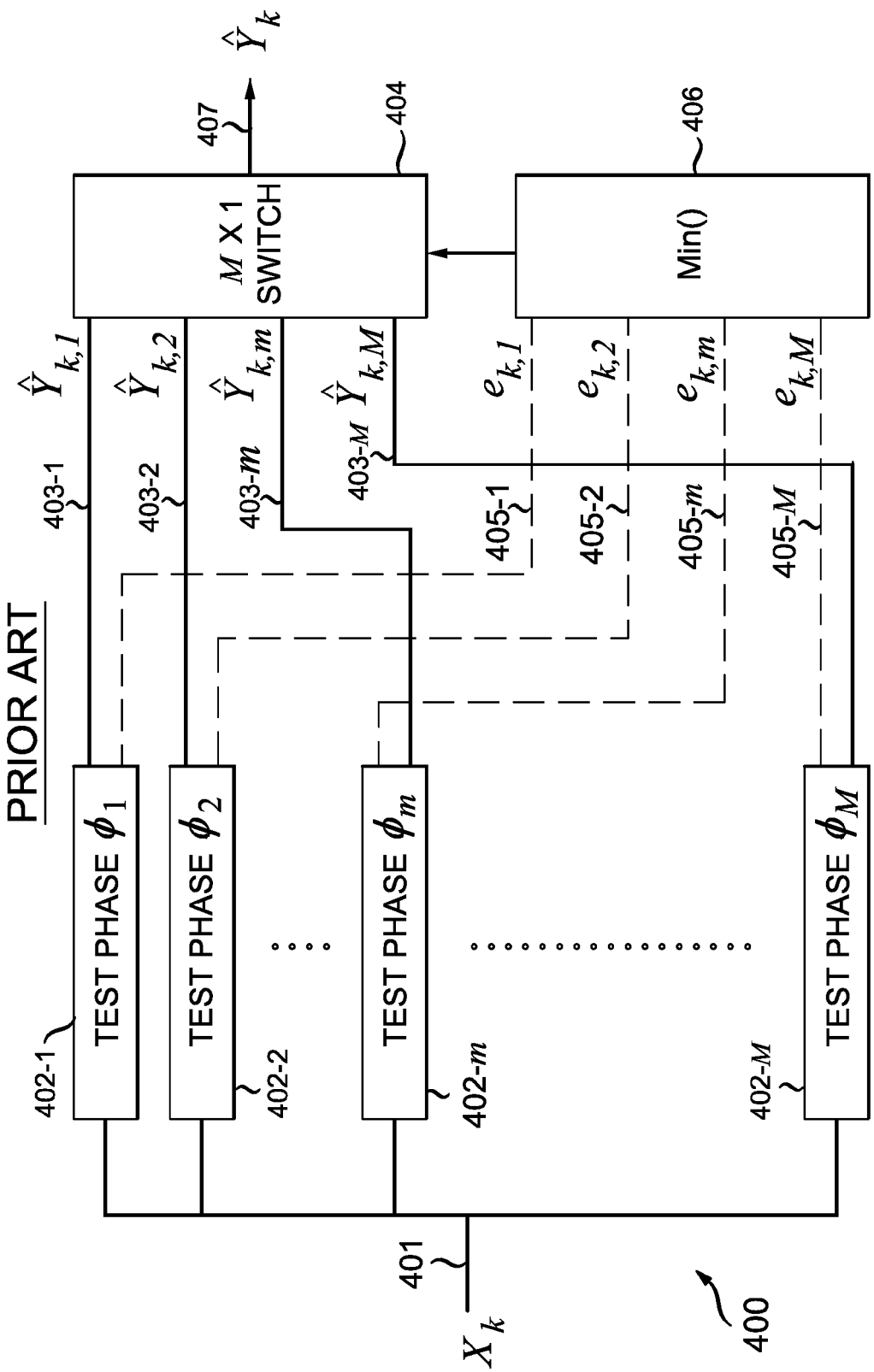

FIG. 4A and FIG. 4B show schematic block diagrams for a prior-art feed-forward carrier phase recovery algorithm based on a blind phase search method (T. Pfau et al., "Hardware-Efficient Coherent Digital Receiver Concept With Feedforward Carrier Recovery for M-QAM Constellations," J. Lightwave Technology, Vol. 27, No. 8, Apr. 15, 2009, pp. 989-999). The blocks refer to functional entities. FIG. 4A shows one test phase block 402-$m$, for a test carrier phase angle $\phi_m$, where $$\phi_m = \frac{m-1}{M} \cdot \frac{\pi}{2}, m \in \{1, 2, \ldots M\}. \tag{E1}$$

The digitized signal (one sample per symbol) entering into the test phase block 402-$m$ is denoted as $X_k$ 401. To recover carrier phase in a pure feed-forward approach, the received signal $X_k$ is inputted into multiplier operator 422 and multiplied by $e^{j\phi_m}$ 423 to rotate $X_k$ by test carrier phase angle $\phi_m$. The output of multiplier operator 422 is output 425, which is the rotated symbol $X_k e^{j\phi_m}$. The quantity $X_k e^{j\phi_m}$ is inputted into decision block 424, which makes the best estimate of the originally transmitted signal based on the received signal. The output of decision block 424 is output 403-$m$, which is the decoded symbol $\hat{Y}_{k,m}$. The quantities $X_k e^{j\phi_m}$ and $\hat{Y}_{k,m}$ are inputted into add/subtract operator 426. The output of add/subtract operator 426 is output 427, $d_{k,m}$, where $d_{k,m} = X_k e^{j\phi_m} - \hat{Y}_{k,m}$. The quantity $d_{k,m}$ is then inputted into squared-distance operator 428. The output of squared-distance operator 428 is output 429, $|d_{k,m}|^2$, which is the squared distance to the closest constellation point calculated in the complex plane:

$$|d_{k,m}|^2 = |X_k e^{j\phi_m} - \{X_k e^{j\phi_m}\}_D|^2 \tag{E2}$$
$$= |X_k e^{j\phi_m} - \hat{Y}_{k,m}|^2.$$

where the subscript D refers to the output of decision block 424.

To remove distortions from additive noise, the squared distances of 2N consecutive test symbols rotated by the same carrier phase angle $\phi_m$ are summed up: the quantity $|d_{k,m}|^2$ is inputted into summation operator 430. The output of summation operator 430 is output 405-$m$, $e_{k,m}$, where $$e_{k,m} = \sum_{n=-N+1}^{N} |d_{k+n,m}|^2. \tag{E3}$$

The optimal value of the filter width 2N depends on the product of the laser linewidth times the symbol rate.

Refer to FIG. 4B for a schematic block diagram of the overall single-stage blind phase search process 400. The operations shown in FIG. 4A are processed in parallel for all $$\phi_m = \frac{m-1}{M} \cdot \frac{\pi}{2},$$

$m \in \{1, 2, \ldots M\}$, as represented by test phase block 402-1 to test phase block 402-M. The corresponding decoded output symbols, $\hat{Y}_{k,1}$ 403-1 to $\hat{Y}_{k,M}$ 403-M, are inputted into M×1 switch 404. The sums of the squared distances, $e_{k,1}$ 405-1 to $e_{k,M}$ 405-M are inputted into minimization search block 406. The optimum phase angle is determined by searching for the minimum sum of the squared distances. The corresponding decoded output symbol $\hat{Y}_k$ 407 can be selected from the set of values $\hat{Y}_{k,m}$ by switch 404, controlled by the index of the minimum sum of squared distances; that is $\hat{Y}_k = \hat{Y}_{k,m=min}$ for which $e_{k,m=min}$ is the minimum value of $e_{k,m}$.

The computational complexity of the blind phase search method described above depends on the required number of test phase angles; this number can be high for high-order M-QAM due to the high requirement on the phase resolution.

Since testing each phase angle requires the series of digital operations shown in FIG. 4A, the overall number digital operations shown in FIG. 4B is extremely computationally intensive for high-order M-QAM.

Figure 5A:
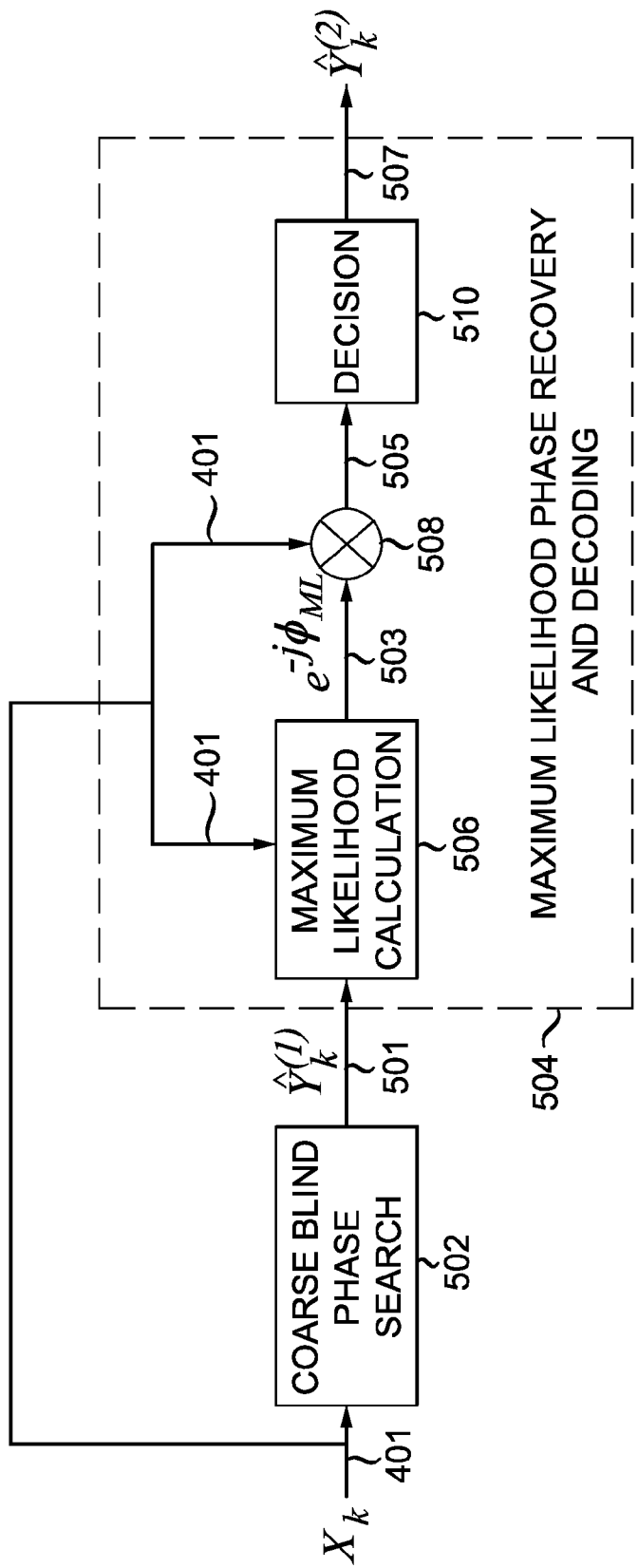
FIG. 5A and FIG. 5B show schematics of multi-stage carrier phase recovery methods.

FIG. 5A shows a schematic block diagram for a two-stage carrier phase recovery algorithm according to an embodiment. The received signal $X_k$ 401 is first inputted into coarse blind phase search block 502. The operations in this block are similar to those discussed above with respect to FIG. 4A and FIG. 4B. In this instance, however, only a subset (less than M) of the possible carrier phases are tested. In an embodiment, B carrier phases, where B<M/2, are tested. The output of coarse blind phase search block 502 is a rough estimate of the optimal phase angle. The output of coarse blind phase search block 502 is output 501, which is the decoded symbol $\hat{Y}_k^{(1)}$. The quantity $\hat{Y}_k^{(1)}$ and the original signal $X_k$ are then inputted into maximum likelihood phase recovery and decoding block (MLPRD) 504. The output of MLPRD block 504 is output 507, denoted $\hat{Y}_k^{(2)}$, which is a refined estimate.

The operations within MLPRD block 504 proceeds as follows. The quantity $\hat{Y}_k^{(1)}$ and the original signal $X_k$ inputted into maximum likelihood (ML) calculation block 506, in which the following calculations are performed [J. G. Proakis, Digital Communications, 4$^{th}$ edition, Chapter 6, pg. 348, McGraw-Hill (2000)]:

$$H_k = \sum_{n=k-N+1}^{k+N} X_n[\hat{Y}_k^{(1)}]^* \quad (E4)$$

$$\phi_k^{ML} = \tan^{-1}(\text{Im}[H_k]/\text{Re}[H_k]).$$

Here $\phi_k^{ML}$ is the refined phase estimate.

The output of maximum likelihood calculation block 506 is output 503, which is the phase rotation factor $e^{-j\phi_{ML}}$. The phase rotation factor and the signal $X_k$ are inputted into multiplier 508. The output of multiplier 508 is output 505, which is the rotated symbol $X_k e^{-j\phi_{ML}}$. The rotated symbol is inputted into decision block 510, which makes the best estimate of the originally transmitted signal based on the received signal. The output of decision block 510 is output 507, which is the refined estimate $\hat{Y}_k^{(2)}$.

Figure 5B:
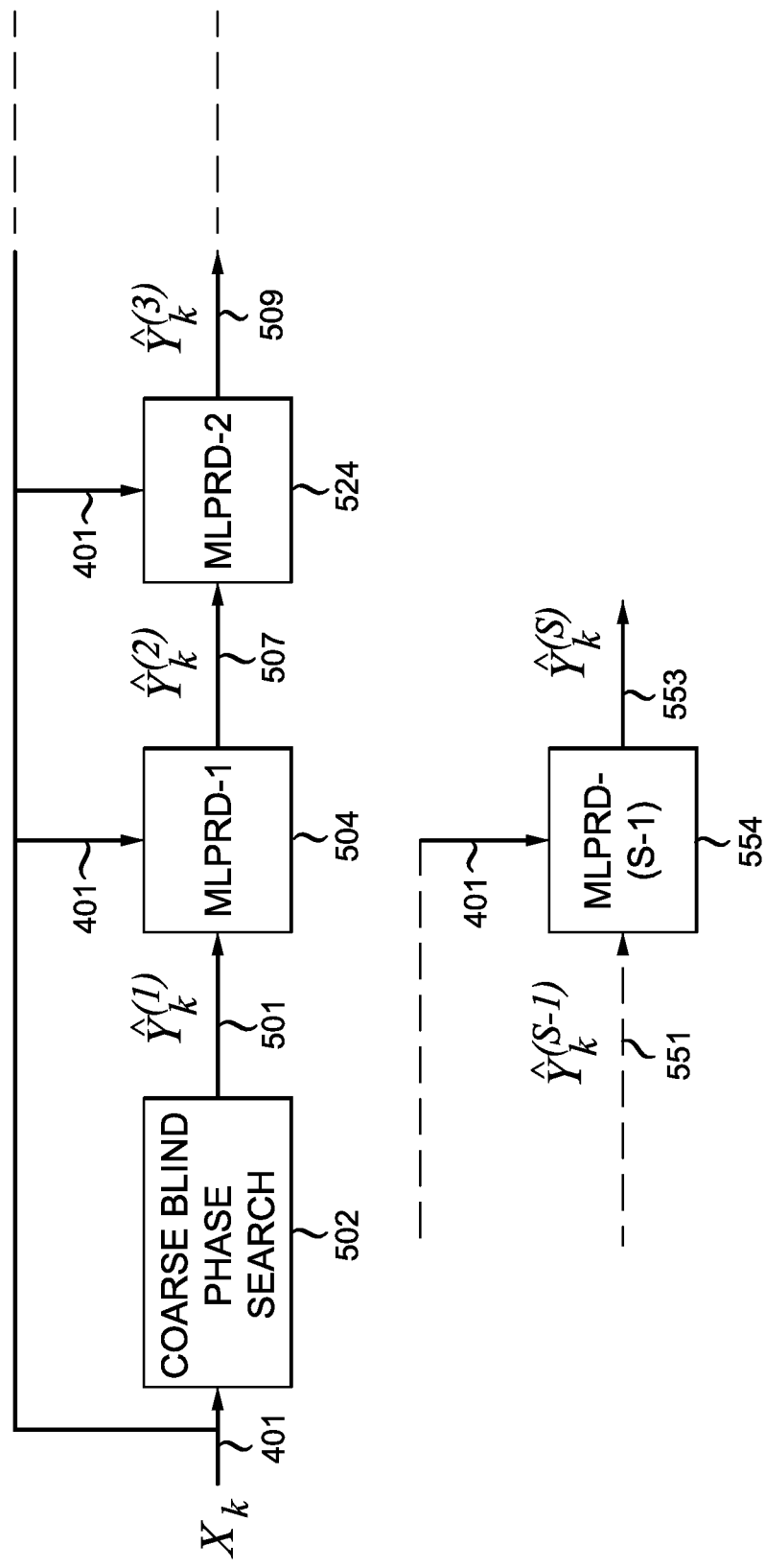

The estimate $\hat{Y}_k^{(2)}$ can be further refined by a second stage of maximum likelihood phase recovery and decoding. FIG. 5B shows an S-stage algorithm with an initial coarse blind phase search 502 stage followed by S−1 MLPRD stages. Shown in FIG. 5B are MLPRD-1 504 second stage, MLPRD-2 524 third stage, and MLPRD-(S−1) 554 S-th stage. The output of MLPRD-2 524 is output 509, which is $\hat{Y}_k^{(3)}$. The last stage receives output 551 ($\hat{Y}_k^{(S-1)}$) from the previous stage and outputs output 553, which is the final value ($\hat{Y}_k^S$).

Since only a rough location of the optimal carrier phase needs to be estimated in coarse blind phase search stage 502, the required number of test phase angles can be reduced substantially from the required number of test phase angles used in the single-stage blind phase search method 400 (FIG. 4A and FIG. 4B). In practice, the required number of digital operations for a ML-phase estimate (E4) is equivalent to testing only one phase angle using the blind phase search method. As a consequence, the required computational efforts for the multi-stage carrier recovery algorithm can be substantially lower than that required by the single-stage blind phase search method.

Figure 6:
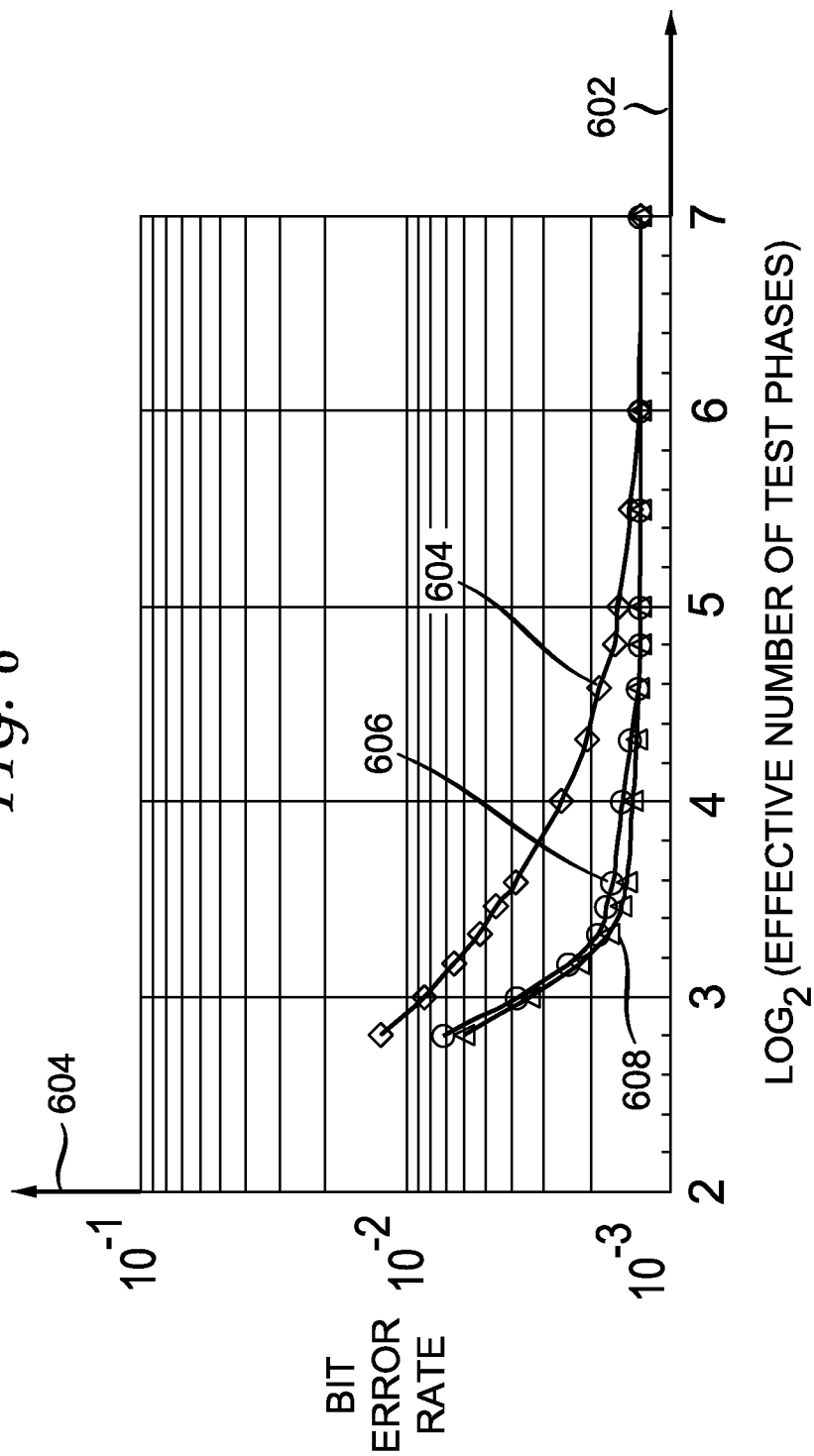
FIG. 6 shows plots of bit error rate as a function of the logarithm of the effective number of test phases.

FIG. 6 shows the results of numerical simulation for square 64-QAM. The horizontal axis 602 represents the $\log_2$ of the required effective number of test phase angles. The vertical axis 604 represents the bit error rate (BER). Plot 604 shows the results for the prior-art single-stage blind phase search method; plot 606 shows the results for a two-stage method (initial coarse blind phase search stage followed by one MPLRD stage) according to an embodiment; and plot 608 shows the results for a three-stage method (initial coarse blind phase search stage followed by two MPLRD stages) according to an embodiment. For these simulations, the following assumptions were used: (1) The baud rate is equal to 38 symbols/s, corresponding to 224 Gbits/s; (2) The received optical signal-to-noise ratio (OSNR) at 0.1 nm noise bandwidth is equal to 28 dB; (3) The 3-dB receiver electrical bandwidth is equal to 0.55×baud rate; (4) The laser linewidth for both the signal source and the local oscillator is equal to 100 kHz; (5) The signal entering into the carrier phase recovery block is sampled at one sample per symbol and the used block/filter width for phase recovery is assumed to be 28, which is close to the optimal value; and (6) A cascaded multi-modulus algorithm based adaptive equalizer has been employed prior to the carrier phase recovery block to equalize the receiver filtering effects.

As seen in the plots in FIG. 6, to achieve the optimal performance, the single-stage blind phase search method needs to test about 64 different phase angles, while the three-stage algorithm only needs to equivalently test 18 different phase angles, resulting in a reduction of computational efforts by a factor more than 3 (the two-stage algorithm requires 20 equivalent test phase angles). Because the multi-stage method employs a feed-forward configuration and involves all the current symbols for the phase estimate, it can achieve the same linewidth tolerance as the single-stage blind phase search method, but with significantly reduced computational power.

Figure 7:
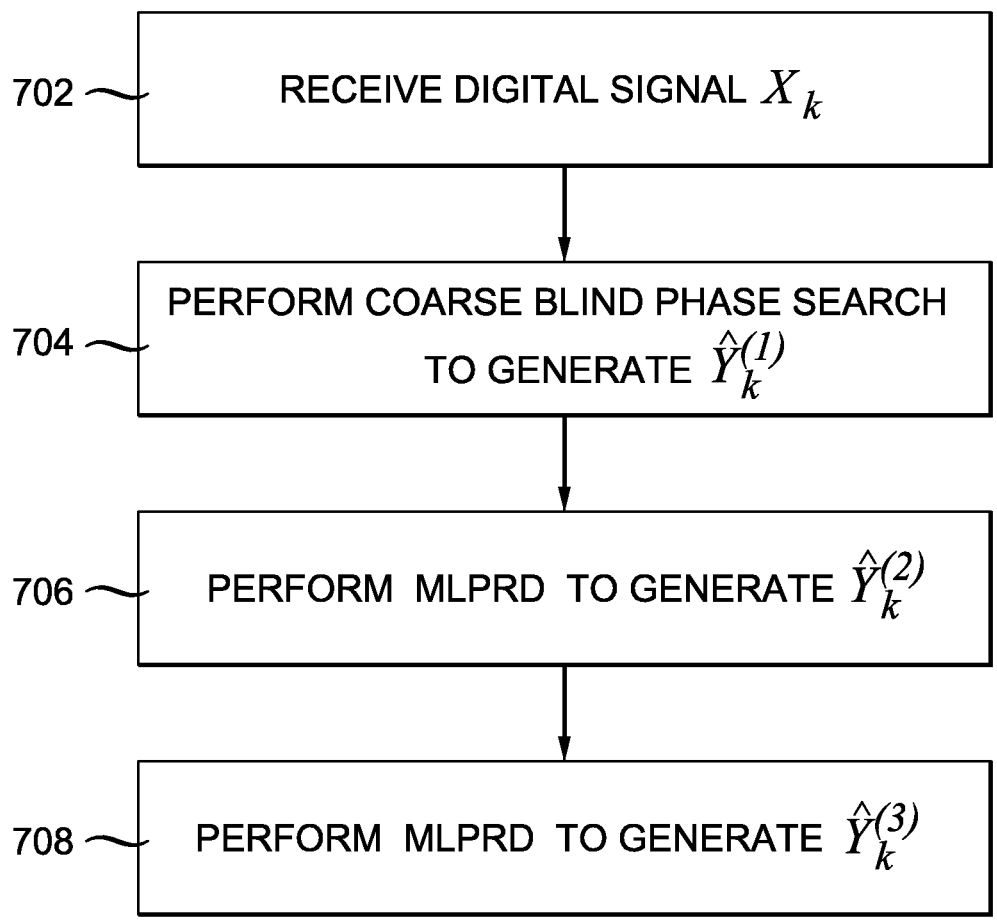
FIG. 7 shows a flowchart of a multi-stage carrier phase recovery method.

FIG. 7 shows a flowchart of a multi-stage carrier phase recovery method, according to an embodiment. In step 702, a digital signal $X_k$ is received. The process then passes to step 704, in which an initial coarse blind phase search stage is performed to generate $\hat{Y}_k^{(1)}$ the first estimate of the decoded symbol. The process then passes to step 706, in which a first maximum likelihood phase recovery and decoding stage is performed to generate $\hat{Y}_k^{(2)}$ the second (refined) estimate of the decoded symbol. The process then passes to step 708, in which a second maximum likelihood phase recovery and decoding stage is performed to generate $\hat{Y}_k^{(3)}$ the third (further refined) estimate of the decoded symbol.

The multi-stage carrier phase recovery method described above was illustrated with two-stages and three-stages for a M-QAM signal. In general, the multi-stage carrier phase recovery method can include N-stages, where N is an integer greater than or equal to two. In general, the multi-stage carrier phase recovery method can be used with any modulation technique.

The multi-stage carrier phase recovery method described above used a coarse blind phase search as the initial coarse phase recovery stage. In general, other phase estimate methods can be used for the first stage. As one example, the carrier phase can be initially estimated by the traditional decision-directed phase-locked loop, which is widely used for carrier recovery in RF communications (A. Tarighat, "Digital Adaptive Phase Noise Reduction in Coherent Optical Links", J. Ligtwave Technology, Vol. 24, No. 3, March 2006, pp. 1269-1276 and I. Fatadin, "Compensation of Frequency Offset for Differentially Encoded 16- and 64-QAM in the Presence of Laser Phase Noise", IEEE Photonics Technology Letters, Vol. 22, No. 3, Feb. 1, 2010, pp. 176-178). The decided signal following this first-stage carrier phase recovery can then be used as the reference signal for the second-stage carrier phase recovery. As discussed above, however, a stand-alone decision-directed phase-locked loop has poor laser phase noise tolerance. In embodiments of the multi-stage carrier phase recovery method, a decision-directed phase-locked loop is used only in the first stage for coarse phase recovery, and carrier phase estimate accuracy can be improved by the following carrier phase recovery stages.

In general, the first stage is referred to herein as coarse phase recovery. Coarse phase recovery refers to any phase recovery scheme that can recover the carrier phase to some extent such that the resulting decision error is smaller than the case without applying such phase recovery scheme (but not close to the optimum). For example, assume that the measured decision error rate without using any phase recovery scheme is A, and the measured decision error rate by introducing one specific phase recovery scheme is B. As long as B<A, then the introduced phase recovery scheme is a coarse phase recovery scheme. Therefore, embodiments of coarse phase recovery include a coarse blind phase search method, a decision-directed phase-locked loop, and other phase recovery schemes. In general, B is not close to the optimum value (as determined by user-specified criteria), since the coarse phase recovery scheme emphasizes reduced computational complexity and increased computational speed rather than high accuracy.

The multi-stage carrier phase recovery method described above used a maximum likelihood phase estimate in the second and higher stages. In general, other phase estimate methods can be used for the second and higher stages. As one example, the carrier phase can be estimated by directly calculating the average phase rotation of the original received signal (undecoded signal prior to carrier phase recovery) relative to the decoded signal obtained from the previous stage; this method is referred to herein as an average phase rotation estimate. As another example, the blind phase search method with a refined (reduced or restricted) phase scan range can be used in the second and higher stages; this method is referred to herein as a restricted blind phase search estimate. Note that different methods be used for different stages; for example, a maximum likelihood estimate can be used for the second stage, and a restricted blind phase search estimate can be used for the third stage.

Since the multi-stage carrier phase recovery method is performed after optical to electronic conversion (see FIG. 1), it is also applicable to other carriers. For example, a radio-frequency (RF) carrier can be mixed in a RF coherent mixer with a reference RF signal generated by a local RF oscillator. The output of the RF coherent mixer can then be converted to different electrical signals and digitized.

Figure 8:
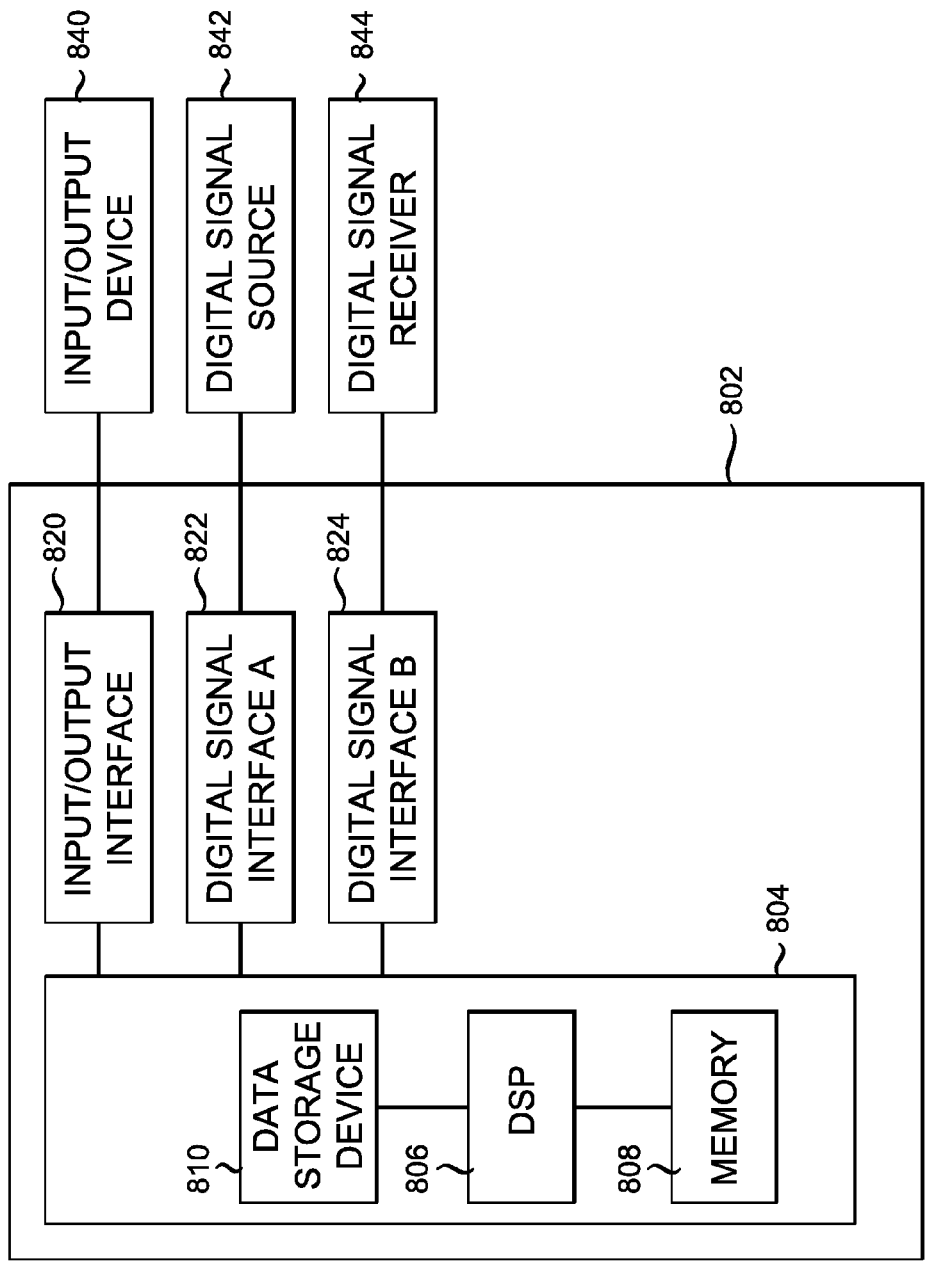
FIG. 8 shows a schematic of a computational system for implementing a multi-stage carrier phase recovery method.

FIG. 8 shows an example of a computational system 802 for performing a multi-stage carrier phase recovery process. One skilled in the art can construct the computational system 802 from various combinations of hardware and software (including firmware). One skilled in the art can construct the computational system 802 from various combinations of electronic components, such as general purpose microprocessors, digital signal processors (DSPs), application-specific integrated circuits (ASICs), field-programmable gate arrays (FPGAs), random access memory, and non-volatile read-only memory.

Computational system 802 comprises computer 804, which includes a digital signal processor (DSP) 806, memory 808, and data storage device 810. Data storage device 810 comprises at least one non-transitory, persistent, tangible computer readable medium, such as non-volatile semiconductor memory (data storage device 810 can also comprise other non-transitory, persistent, tangible computer readable medium with sufficiently high data transfer rates).

Computational system 802 further comprises input/output interface 820, which interfaces computer 804 with input/output device 840. Data, including computer executable code can be transferred to and from computer 804 via input/output interface 820. Computational system 802 further comprises digital signal interface A 822, which interfaces computer 804 with digital signal source 842. An example of digital signal source 842 is a DSP that transmits digital signal $X_k$. Computational system 802 further comprises digital signal interface B 824, which interfaces computer 804 with digital signal receiver 844. An example of digital signal receiver 844 is a DSP that receives decoded symbol $\hat{Y}_k^{(3)}$.

As is well known, a computer operates under control of computer software, which defines the overall operation of the computer and applications. DSP 806 controls the overall operation of the computer and applications by executing computer program instructions that define the overall operation and applications. The computer program instructions can be stored in data storage device 810 and loaded into memory 808 when execution of the program instructions is desired. The method steps shown in the flowchart in FIG. 7 can be defined by computer program instructions stored in memory 808 or in data storage device 810 (or in a combination of memory 808 and data storage device 810) and controlled by the DSP 806 executing the computer program instructions. For example, the computer program instructions can be implemented as computer executable code programmed by one skilled in the art to perform algorithms implementing the method steps shown in the flowchart in FIG. 7. Accordingly, by executing the computer program instructions, the DSP 806 executes algorithms implementing the method steps shown in the flowchart in FIG. 7.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the disclosure. Those skilled in the art could implement various other feature combinations without departing from the scope and spirit of the disclosure.

The invention claimed is:

1. A method for carrier phase recovery of a carrier wave modulated with a plurality of information symbols, the method comprising:
   receiving a digital signal corresponding to an information symbol, wherein the information symbol represents data; and
   performing a coarse phase recovery using the digital signal, wherein the performing the coarse phase recovery comprises:
      generating a first estimate of an optimal phase angle corresponding to the digital signal by performing a coarse blind phase search;
      generating a second estimate of the optimal phase angle corresponding to the digital signal by inputting the digital signal and the first estimate of the optimal phase angle into a first maximum likelihood phase recovery and decoding block; and
      generating a third estimate of the optimal phase angle corresponding to the digital signal by inputting the digital signal and the second estimate of the optimal phase angle into a second maximum likelihood phase recovery and decoding block.

2. The method of claim 1, wherein the generating a second estimate of the optimal phase angle precedes the generating the third estimate of the optimal phase angle.

3. The method of claim 1, wherein the carrier wave is modulated with M-ary quadrature amplitude modulation and the performing the coarse blind phase search comprises testing fewer than M test phase angles.

4. The method of claim 1, wherein the carrier wave is an optical carrier wave.

5. The method of claim 1, further comprising:
generating a fourth estimate of the optimal phase angle corresponding to the digital signal by inputting the digital signal and the third estimate of the optimal phase angle into a third maximum likelihood phase recovery and decoding block.

6. The method of claim 5, wherein the generating the third estimate of the optimal phase angle precedes the generating the fourth estimate of the optimal phase angle k.

7. An apparatus for carrier phase recovery of a carrier wave modulated with a plurality of information symbols, the apparatus comprising:
a processor; and
a memory to store computer program instructions,
the computer program instructions, when executed on the processor, cause the processor to perform operations comprising:
receiving a digital signal corresponding to an information symbol, wherein the information symbol represents data; and
performing a coarse phase recovery using the digital signal, wherein performing the coarse phase recovery comprises:
generating a first estimate of an optimal phase angle corresponding to the digital signal by performing a coarse blind phase search;
generating a second estimate of the optimal phase angle corresponding to the digital signal by inputting the digital signal and the first estimate of the optimal phase angle into a first maximum likelihood phase recovery and decoding block; and
generating a third estimate of the optimal phase angle corresponding to the digital signal by inputting the digital signal and the second estimate of the optimal phase angle into a second maximum likelihood phase recovery and decoding block.

8. The apparatus of claim 7, wherein the generating a second estimate of the optimal phase angle precedes the generating the third estimate of the optimal phase angle.

9. The apparatus of claim 7, wherein the carrier wave is modulated with M-ary quadrature amplitude modulation and the performing the coarse blind phase search comprises testing fewer than M test phase angles.

10. The apparatus of claim 7, the operations further comprising:
generating a fourth estimate of the optimal phase angle corresponding to the digital signal by inputting the digital signal and the third estimate of the optimal phase angle into a third maximum likelihood phase recovery and decoding block.

11. The apparatus of claim 10, wherein the generating the third estimate of the optimal phase angle precedes the generating the fourth estimate of the optimal phase angle.

12. A non-transitory computer readable medium storing computer program instructions for carrier phase recovery of a carrier wave modulated with a plurality of information symbols, which, when executed on a processor, cause the processor to perform operations comprising:
receiving a digital signal corresponding to an information symbol, wherein the information symbol represents data; and
performing a coarse phase recovery using the digital signal, wherein the performing the coarse phase recovery comprises:
generating a first estimate of an optimal phase angle corresponding to the digital signal by performing a coarse blind phase search;
generating a second estimate of the optimal phase angle corresponding to the digital signal by inputting the digital signal and the first estimate of the optimal phase angle into a first maximum likelihood phase recovery and decoding block; and
generating a third estimate of the optimal phase angle corresponding to the digital signal by inputting the digital signal and the second estimate of the optimal phase angle into a second maximum likelihood phase recovery and decoding block.

13. A non-transitory computer readable medium of claim 12, wherein the generating a second estimate of the optimal phase angle precedes the generating the third estimate of the optimal phase angle.

14. A non-transitory computer readable medium of claim 12, wherein the carrier wave is modulated with M-ary quadrature amplitude modulation and the performing the coarse blind phase search comprises testing fewer than M test phase angles.

15. A non-transitory computer readable medium of claim 12, wherein the processor performs further operations comprising:
generating a fourth estimate of the optimal phase angle corresponding to the digital signal by inputting the digital signal and the third estimate of the optimal phase angle into a third maximum likelihood phase recovery and decoding block.

16. A non-transitory computer readable medium of claim 15, wherein the generating the third estimate of the optimal phase angle precedes the generating the fourth estimate of the optimal phase angle.

* * * * *